United States Patent [19]
Hopfe et al.

[11] Patent Number: 6,093,471
[45] Date of Patent: Jul. 25, 2000

[54] POLYVINYL BUTYRAL SHEET

[75] Inventors: Harold H. Hopfe, Longmeadow; Vincent J. Yacovone, Springfield; Gary Matis, Wilbraham; David P. Bourcier, Ludlow, all of Mass.

[73] Assignee: Solutia Inc., St. Louis, Mo.

[21] Appl. No.: 09/246,680

[22] Filed: Feb. 8, 1999

[51] Int. Cl.[7] ........................................ B32B 3/28
[52] U.S. Cl. .................... 428/141; 428/156; 428/167; 428/172; 428/212
[58] Field of Search ...................... 428/120, 141, 428/156, 166, 167, 172, 212, 220, 409, 437, 188

[56] References Cited

U.S. PATENT DOCUMENTS

| | | | |
|---|---|---|---|
| 5,425,977 | 6/1995 | Hopfe | 428/141 |
| 5,455,103 | 10/1995 | Hoagland et al. | 428/167 |

*Primary Examiner*—Donald Loney
*Attorney, Agent, or Firm*—Michael J. Murphy

[57] ABSTRACT

Thermoplastic sheet comprising plasticized polyvinyl butyral has a regular pattern of ridges and channels integrally formed and arranged in each face at an angle of intersection with respect to each other of at least 25 degrees, the ridges tapering to flattened V-shaped peaks of tight radius of less than 0.0034 inch, each face of the sheet having a surface permanence of at least 70%.

5 Claims, 4 Drawing Sheets

POLYVINYL BUTYRAL SHEET

BACKGROUND OF THE INVENTION

This invention relates to thermoplastic sheet of plasticized polyvinyl butyral (PVB) for use in safety glass and more particularly to a surface pattern in such sheet which reduces its tendency to stick to a like sheet.

Plasticized PVB sheet is used with optically transparent glass in laminated safety panels in vehicle and building windows and the like. It is known to roughen the sheet to create channels through which air exhausts from the interface of the sheet with the glass layer during the initial stage of preparing the safety glass laminate. Unremoved air appears as cloudy patches and detracts from the appearance of the finished laminate. U.S. Pat. No. 5,455,103 to Hoagland et al discloses a form of regular roughness pattern for surfaces of such sheet which optimizes air removal while eliminating an undesirable appearance problem referred to in that patent as moire patterns.

Plasticizer is necessarily present in rather significant amount in such thermoplastic PVB sheet to reduce stiffness and render it capable of absorbing impact forces when the finished glass laminate is forcibly struck. Unfortunately this makes the sheet incapable of self support at room temperature and rather sticky so that abutting layers tend to stick to each other unless stored before use at low temperature (e.g. about 10–15° C.).

To improve efficiency and reduce manufacturing cost, various steps in preparing glass laminates containing plasticized PVB sheet as the shock absorbing layer are increasingly being automated. These steps include unwinding sheet from a supply roll, shaping the sheet by stretching to the approximate curved peripheral configuration of the glass laminate when, for example, to be used as a vehicle windshield and cutting the shaped sheet into blanks which are collected and stacked upstream of the glass laminating process. In the initial laminating step an automated robot is sometimes used to successively peel individual sheets from the top of the stack and transfer them to the next station for combination with glass. If a robot cannot separate the topmost blank from the next subjacent one because of sticking, an alarm rings to bring an operator for manual assistance. This adds cost and may create defects and off grade sheet because of rough handling necessary to separate the sticky abutting blanks.

The problem of sticking abutting layers of PVB sheet can also exist when the finished laminate is for architectural applications. In these applications windows are typically larger than in vehicles and the greater surface area of abutting layers aggravates the sticking problem. It may even be impossible to unwind laps of the sheet from its bulk supply roll, which condition is called roll blocking. This is minimized by storing rolls at reduce ambient temperature, but this requires refrigerated air in the storage area.

A need continues for plasticized PVB sheet with reduced tendency to stick to an abutting layer in a stack or lap of a roll while simultaneously deairing well in forming the glass laminate, even when initially shaped by stretching to conform to the laminate periphery.

SUMMARY OF THE INVENTION

Now improvements have been made in plasticized PVB sheet which alleviate handling problems associated with sticking of abutting layers.

Accordingly, a principal object of this invention is to provide plasticized PVB sheet for laminated safety glass with reduced tendency to stick when stacked or rolled.

Another object is to provide such sheet wherein the sticking improvement is achieved by design of the surface roughness pattern.

A further object is to provide such sheet with reduced stack sticking even after initial shaping by stretching before combining with glass of the laminate.

Yet an additional object is to provide such sheet with a reduced stack sticking property without adverse affect on its deairing or anti-moire properties.

Other objects will in part be obvious and will in part appear from the following description and claims.

These and other objects are accomplished by providing thermoplastic sheet comprising plasticized polyvinyl butyral having a regular pattern of ridges and channels integrally formed in each side arranged at an angle of intersection with respect to each other of at least 25 degrees, the ridges tapering to flattened V-shaped peaks of tight radius of less than 0.0034 inch, the sheet having a surface permanence of at least 70% on each side.

In another aspect, multiple shaped thermoplastic sheets of plasticized polyvinyl butyral are removably positioned in abutting engagement in a stack, each sheet having a regular pattern of ridges and channels integrally formed in each of its sides arranged at an angle of intersection with respect to each other of at least 25 degrees, the ridges tapering to flattened V-shaped peaks of tight radius of less than 0.0034 inch, each sheet having a surface permanence of at least 70% on each side, sheets within the stack being supported by the ridges of one side resting on the ridges of the opposite side of the next lower sheet in the stack, the sheets in the stack having a sticking attractiveness to each other of less than about 80 gms per cm.

BRIEF DESCRIPTION OF THE DRAWINGS

In describing the overall invention, reference will be made to the accompanying drawings wherein.

DETAILED DESCRIPTION OF THE INVENTION

Figure 1:
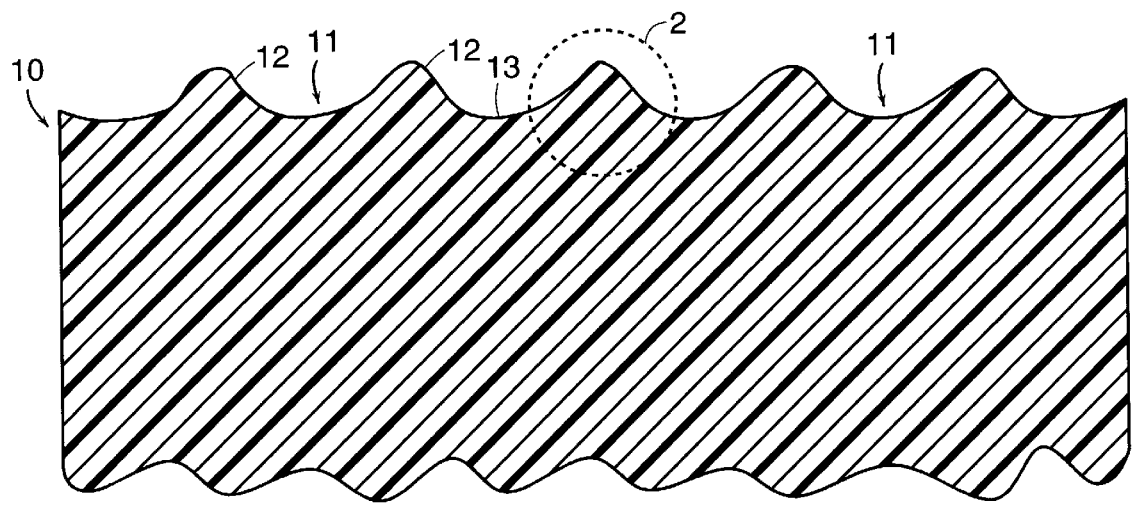
FIG. 1 is an enlarged, partial, vertical sectional view of sheet according to the invention.

Referring to the drawings, thermoplastic sheet 10 (FIG. 1) comprising plasticized polyvinyl butyral has a surface roughness pattern formed in each of its major sides or faces which is generally the same as shown and described in U.S. Pat. No. 5,455,103, the content of which is incorporated herein by reference. Differences from sheet of the '103 patent embodying this invention are highlighted in the description following. The regular surface roughness pattern and its angular arrangement integrally formed in each side of sheet 10 as shown in that patent and FIG. 5 herein provides optimum deairing of the interface of the sheet with glass during preparation of the safety glass laminate, while avoiding undesirable appearance effects caused by moire patterns in the sheet. According to one aspect of this invention, each solid ridge 12 of the noted surface pattern tapers (upwardly in FIGS. 1 and 2) from a base of larger dimension to a relatively sharp but slightly rounded flattened v-shaped peak 14 having a tight radius (R1 in FIG. 2) of less than 0.0034 inch which is measured on the central axis of peak 14. In another aspect of this invention the permanence of the surface pattern in each face of the sheet is at least 70%, preferably at least 85%, when measured according to a procedure described later herein. High surface permanence promotes the reduced contact between abutting surfaces of shaped stacked or rolled sheet which is responsible for the reduced sticking of the invention.

Figure 8:
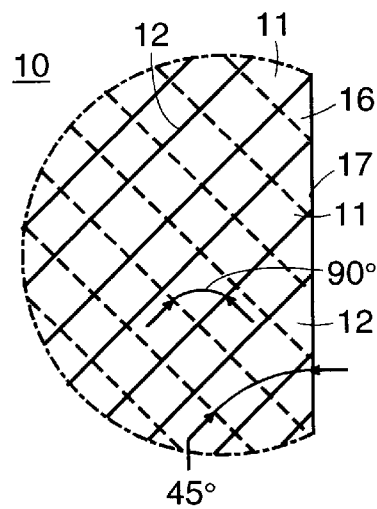
FIG. 8 is a partial, schematic plan view of a portion of the invention sheet.

More particularly, to provide the deairing function, a multitude of parallel, narrow, open top, linear deairing channels 11 are evenly spaced from each other in each side of sheet 10 which are substantially unobstructed lengthwise between marginal edges of the sheet. Sides of deairing channels 11 are formed by continuous, uninterrupted, regularly spaced ridges 12 integrally formed in the surface of each face 16, 18 (FIG. 5) of sheet 10. Immediately adjacent neighboring ridges 12 are spaced 100 to 500 microns from each other (measured at peaks 14) and extend about 30 to 90 microns in height above base 13 of a channel 11. Such spacing and height are abbreviated $R_{sm}$ and $R_z$ respectively in the Surface Permanence Test later described herein. These dimensional relationships may vary from the noted preferred ranges just defined. In the illustrated embodiment, each channel 11 and ridge 12 is per se identically configured on each side 16, 18 of sheet 10 but, to avoid moire effects, are angularly offset with respect to each other wherein the angle of intersection is at least 25 degrees. In the illustrated embodiment, channels 11 and ridges 12 in side 16 of sheet 10 (FIG. 8) are diagonally arranged at 45° to straight linear edge 17 of sheet 10. As shown by the dotted lines in FIG. 8, the ridges and channels in the opposite face of sheet 10 are likewise at 45° to edge 17 so that the angle of intersection of ridges and channels on one side with respect to those on the other side is ninety degrees as identified in FIG. 8. This is further described in the noted '103 patent.

Figure 7:
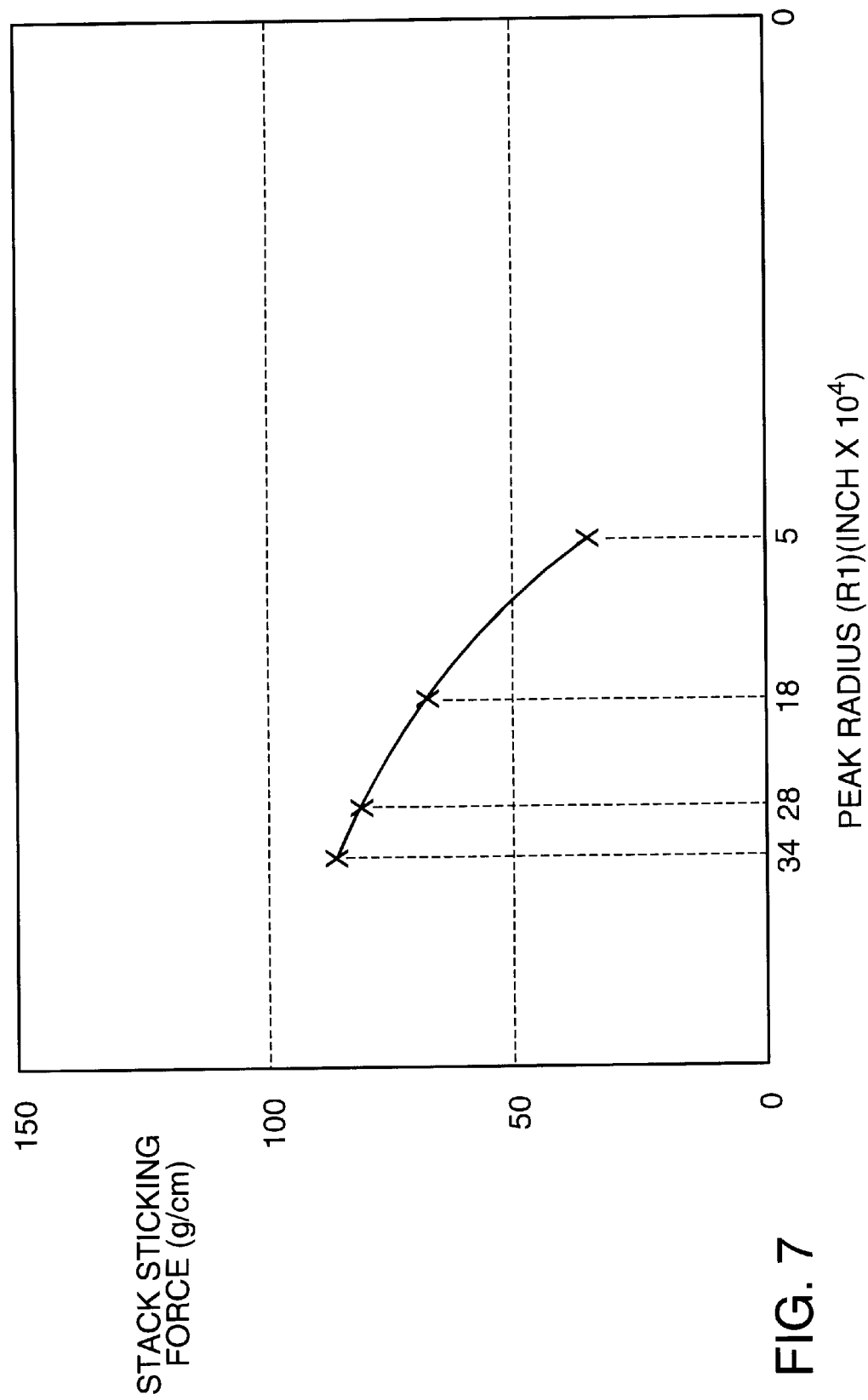
FIG. 7 is a plot illustrating the reduced stack sticking property of sheet according to the invention.

When the linear pattern of channels and ridges on one side intersect those on the other side at an angle less than 25°, an undesirable moire pattern is present in the form of a plaid or wood grain appearance schematically depicted in FIG. 7 of the referenced '103 patent.

Figure 2:
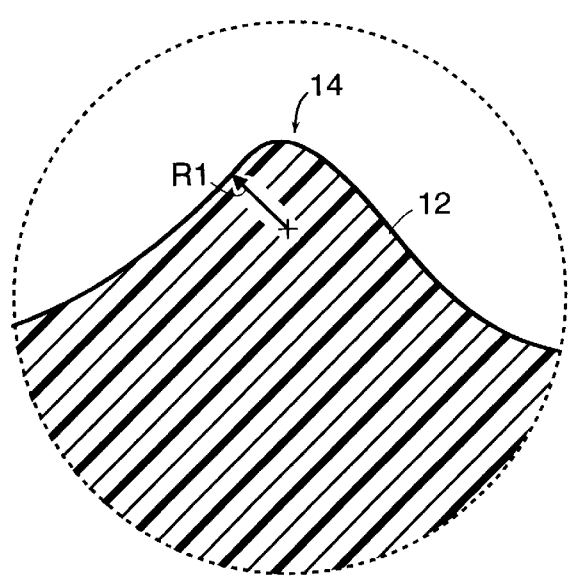
FIG. 2 is an exploded view of area 2 of FIG. 1.
Figure 3:
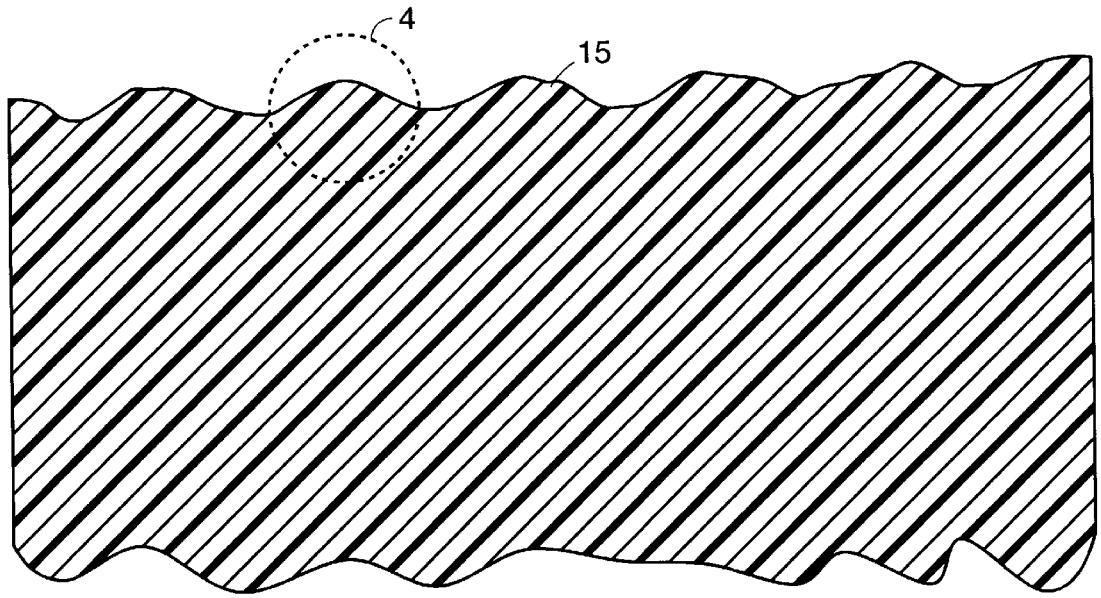
FIGS. 3 and 4 are views similar to FIGS. 1 and 2 of prior art sheet.
Figure 4:
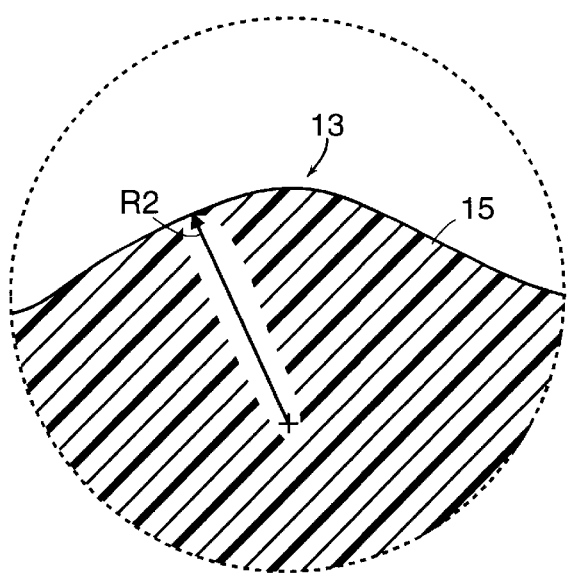

Peaks 14 of ridges 12 in FIGS. 1 and 2 though slightly rounded, are relatively sharp in comparison with peaks 13 of ridges 15 of the prior art surface pattern of FIGS. 3 and 4. The configuration of FIGS. 3, 4 result when forming the pattern according to the procedure of the '103 patent. In particular, peaks 14 of ridges 12 in FIG. 1 though slightly rounded are nevertheless relatively sharp as defined by an R1 in FIG. 2 of <0.0034 inch, and specifically of 0.0006 inch as shown to scale in FIG. 2, whereas R2 is 0.0034 inch as shown to scale in FIGS. 3, 4. When sections of inherently sticky plasticized PVB sheet 10 having angularly arranged ridges 12 of the regular surface pattern described above and the flattened V-shaped peak configuration illustrated in FIGS. 1 and 2 are stacked on top of each other as illustrated with two sheets in FIGS. 5 and 6, stack sticking is reduced in comparison with that using the FIGS. 3 and 4 configuration. More specifically, the force to peelably separate the top sheet 10 in the stack from the next lower sheet is less than about 80 gms. per cm. of sheet length, preferably less than 40 gms./cm. Moreover, sheet 10 of FIGS. 1, 2 is formed at conditions which optimally, desirably retains the illustrated configuration after shaping by stretching. This retention is reflected by a permanence value (as further described hereafter) of at least 70%, preferably at least 85% for the surface in each face 16, 18 of sheet 10. Shaping by stretching occurs in forming a commercial safety glass laminate before positioning the PVB sheet between glass layers. This is to orient a gradient color band along the side of the sheet (not shown) more accurately along the curved edge of the glass laminate when it is to be used as an automobile windshield. Stretching by shaping without such gradient band is often practiced to reduce thickness and therefore cost by reducing the amount of sheet per glass laminate. Stretch shaping, however, is optional in that reduced stack sticking can be achieved with the noted surface configuration without shaping.

The shape in cross section of solid ridges 12 is arbitrary as long as topped with relatively sharp-profiled peaks responsible for the anti-sticking performance and as defined by the values for R1 noted above. Thus, the ridge shape per se can be regular (all identical) or irregular (not all identical) e.g. barrel-shaped, bell-shaped—e.g. circular or polygonal in transverse cross section, conical, cylindrical, triangular, egg-shaped, pyramidal, rectangular, square, semi-circular and the like. The overall pattern of ridges and channels, however, must be regular insofar as arranged in an established orientation as opposed to an irregular, unordered, random arrangement of ridges and channels. As disclosed in the '103 patent, such regular pattern facilitates essentially complete removal of air from the glass-sheet interface in forming the laminate.

Figure 5:
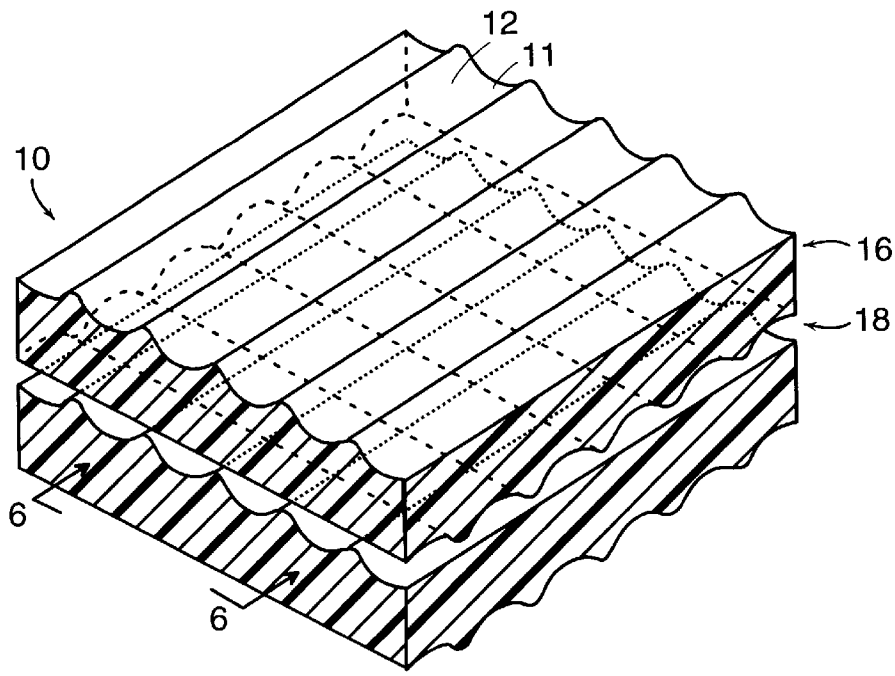
FIG. 5 is a fragmentary, perspective view on an enlarged scale of two sheets of FIGS. 1 and 2 in a stack.
Figure 6:
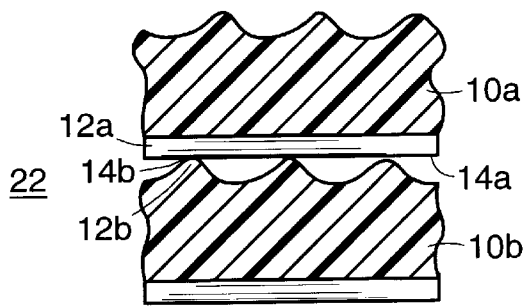
FIG. 6 is an exploded view along 6—6 in FIG. 5.

Simplified stack 22 of the sheet of FIGS. 1, 2 is further illustrated in FIG. 6 by portions of two four-sided sheets with straight marginal edges (not shown) of each sheet essentially parallel to each other. In commercial practice a stack would ordinarily comprise a multitude on the order of about 100 of such sheets. Topmost sheet 10a is readily peelable from stack 22, either manually or non-manually by an automated sheet gripping assembly such as a robot, while encountering no greater a resistance to peeling than about 80 gms. per cm. preferably no greater than 40 gms./cm. as further described hereafter. This is because of the way the sheet faces abuttingly engage each other in the stack. More specifically, peaks 14a of ridges 12a of the downside of upper sheet 10a are directly supported on peaks 14b of ridges 12b in the upside of the next subjacent sheet lob of stack 22. The non-parallel, angular offset arrangement of ridges 12 in each opposing sheet face schematically depicted by dotted lines in FIG. 5 ideally results in the ridges bridging the lower channels and therefore the absence of contact of surfaces of the channel segments between ridge intersections. This spaced absence of touching contact of opposite channel segments, or conversely the spaced, essentially point contact of peaks 14 at the intersecting points of crossing ridges, optimally minimizes troublesome stack sticking forces encountered with surface patterns having greater surface to surface contact between abutting sheets in a stack. The FIG. 6 arrangement of abutting sheets 10a and 10b supported solely on the peaks of the ridges may, however, be ideal depending on whether any conditions prevail to cause further contact between surface portions of abutting sheets from that shown. For example, in addition to the contact of FIG. 6, a portion of a ridge peak of an upper sheet may sag into contact with an opposite surface portion of a channel of the next lower sheet (not shown) when the stack is rather high and the abutting sheets are toward the bottom of the stack, or the level of plasticizer in the sheet or the temperature and humidity of the surroundings where the stack (or roll) is located is on the high side, thereby reducing the modulus of the sheet and promoting sagging. However, even with any such further contact, the relatively sharp edge contact of abutting ridge peaks desirably promotes stack sticking reduction to a marked degree.

The polyvinyl butyral resin component of the thermoplastic sheet of the invention comprises about 10 to 30 weight % hydroxyl groups expressed as polyvinyl alcohol, and about 0 to 2.5 weight % acetate expressed as polyvinyl acetate with the balance being butyral expressed as polyvinyl butyral. The non-critical thickness of the sheet can vary and is typically about 0.25 to 1.5 mm, preferably 0.35 to 0.75 mm. PVB sheet is commercially available from Solutia Inc. as Saflex® sheet and E. I. dupont de Nemours and Co. as Butacite® polyvinyl butyral resin sheeting.

PVB sheet contains about 20 to 80, preferably 25 to 45 parts of plasticizer per 100 parts PVB resin. Such plasticizers are typically disclosed in U.S. Pat. No. 4,654,179, col. 5, lines 56–65, the content of which is incorporated herein by reference. Dihexyl adipate and triethylene glycol di-2 ethylhexanoate are preferred.

In addition to plasticizer(s), sheet of the invention may optionally contain additives to improve performance such as dyes, pigment colorants, light stabilizers, antioxidants, glass adhesion control agents and the like. As noted above, the sheet may have an anti-glare gradient band extending along one side adjacent its edge which may be incorporated into the sheet according to the method and system disclosed in U.S. Pat. No. 4,316,868, the content of which is incorporated herein by reference.

As manufactured the thermoplastic sheet comprising plasticized PVB is opaque but becomes optically clear after melt collapsing the roughened surfaces during elevated temperature formation of the layered safety glass laminate.

Properties of PVB sheet reported in Examples following are measured according to the following procedures.

1) Stack Sticking. This quantitatively measures the degree of sticking of plasticized PVB sheets to each other when stacked under conditions simulating those typically encountered in commercially preparing glass laminates with sheet from the stack.

A) Of unshaped Sheet. Plasticized PVB sheet is cut into sixteen 20 cm×20 cm pieces to provide eight sheet pairs which are clipped into and suspended vertically in rectangular racks and conditioned in a moisture cabinet at 37° C., 25% RH for four hours to a sheet moisture level of 0.4%. Then a section of polyethylene sheet is inserted between each sheet pair and the eight pairs placed on top of each other in the moisture cabinet to simulate a stack. Humidity is adjusted to 27% RH and air temperature in the cabinet to 30° C. Glass covers are placed on top of the stack and weights totalling 30 kg placed on the glass. The stack is kept at these conditions for 16 hours. Each sheet pair is then sealed in a plastic bag and brought to room temperature conditions (72° F., 50% RH) over three hours. Each sheet pair is cut into five 4 cm×20 cm strips (length along sheet extrusion direction). The stack sticking measurement value reported below is the average of two groups of five strips per group. Using an MTS® Sintech Model 1/G Tensonometer (MTS Systems Corp. of Eden Prairie, Minn.) and 20 in./min. peel speed, the force to separate two strips of a sample pair in grams per cm. of length is determined.

B) Of shaped sheet. Sheet samples cut as first described in A) above are placed in rectangular shaping racks wherein one rack side (weighing about 2–3 pounds) is vertically moveable with respect to the other three. Sheet sections mounted in the shaping racks are placed in an oven at 100° C. for 4 min., the intent being to soften and stretch the sheet about 2½–3 inches via the movable side. After equilibration to room temperature, stack sticking is measured as described above—i.e. 16 sections are cut and equilibrated at 37° C. etc.

2) Surface Permanence measures the capability of a PVB sheet surface to retain its roughness pattern at elevated temperature. This simulates that encountered during shaping when the sheet is heated and stretched to conform to the laminate periphery and the later removal of air from the interface between a glass layer and the PVB sheet in preparing the glass laminate. Sheet with the regular roughness surface pattern of the invention provided by the embossing process described in Ex. 1 is cut into a 5×5 inch (12.7×12.7 cm) sample. Place a 5½×5½ inch (14×14 cm) piece of polyethylene terephthalate (PET) film on a wood frame resting on a horizontal surface, the frame periphery being slightly smaller than the PVB sheet sample. Place the PVB sheet sample on the PET film then another section of PET film over the sheet and then a second frame of the same dimensions on top of the layered assembly. Clamp the frames together with binder clips to restrict PVB sheet movement as it is heated. Place the clipped frames containing the PVB sheet sample in an oven at 100° C. for 5 minutes. Measure surface roughness using a Perthen S8P Profilometer further described below in Example 1. Calculate surface permanence (PERM) according to the formula: PERM=(SR(base) minus SR(100° C.)/SR(base) minus SR(emb)×100% where SR=roughness pitch $(R_{sm})$/ roughness height $(R_z)$; SR(base)=SR of sheet surface before embossing; SR(100° C.)=SR of sheet surface after 100° C. exposure; and SR(emb)=SR of unheated embossed sheet surface.

The invention is further described in the following illustrative Examples which are not intended to limit the invention.

EXAMPLE 1

Thirty mil (0.76 mm) thick PVB sheet (Saflex® interlayer from Solutia Inc.) containing about 38 parts plasticizer per 100 parts PVB resin, about 38 inches (96.5 cm) wide, is fed at 55° F. (13° C.) at 20 fpm (6.1 meters per min.) to an embossing station as shown in FIG. 1 of the '103 patent. The station comprises a metal embossing roll rotatably engaging a cooperating rubber-faced backup roll and forming a nip between the two through which the sheet is passed to form, by displacing the plastic of the sheet, a pattern in the sheet surface which is the complementarily shaped negative of a pattern in the peripheral surface of the embossing roll. The embossing and rubber faced backup rolls are each 6.5 inch (16.5 cm) in diameter; contact pressure between embossing roll and backup roll is 120 pounds per sq. inch (827 kpa). The peripheral surface of the embossing roll is engraved with a multitude of identical, individual microscopic embossments which are V-shaped in vertical cross section. These embossments are arranged in a helical pattern of rows oriented at 45 degrees to the longitudinal embossing roll axis at a frequency of 85 embossments per inch (33 per cm), measured normal to the helical direction, as shown in FIGS. 4, 5 of the '103 patent. Embossing roll surface temperature is regulated at 500° F. (260° C.) by circulating an appropriate heating medium beneath its surface. A conventional vacuum roll downstream of the embossing nip pulls the embossed sheet off the embossing roll surface. With one side embossed as just described, the sheet is then passed through the nip again with the unembossed side against the embossing roll in the manner generally described in the '103 patent. After cooling to room temperature the embossed surface of the sheet is examined using a Bausch and Lomb Microscope in combination with a Sony video camera system (SSC-S20); peak radius (R1 in FIG. 1) is measured at 0.0018 inch. The exact cross sectional configuration and height of the actual ridges in the surface of the sheet formed under the conditions just noted which includes R1 are magnified 100 times and photographed and then the photograph is enlarged further to exactly prepare the depictions in FIGS. 1 and 2. R1 is obtained by placing the crosshairs of the microscope at the base of and on the centerline of a ridge and then moving out on the centerline until the radius of the peak is reached to identify R1. Using a tracing stylus, surface roughness is measured with a model S8P Perthometer from Mahr Corp., Cincinnati, Ohio. In this regard, $R_z$ defined according to DIN 4768 (May 1990) is the average height of the ridges within a reference length $l_e$ which is set as desired and is 2.5 mm. $S_m$ within a reference length $l_m$ (12.5 mm) is the average distance between ridges and is characterized according to DIN 4762. Results are as follows:

Base sheet (unembossed):
  $R_z$=34.1 micrometers
  $R_{sm}$=536.2 micrometers
Embossed Sheet
  $R_z$=52.5 micrometers
  $R_{sm}$=416.4 micrometers
After 100° C. exposure
  $R_z$=48.7 micrometers
  $R_{sm}$=429.6 micrometers
Surface permanence (average of both sides)=88.5%
Following the procedure described above, stack sticking is measured at 30.9 gm/cm.

EXAMPLE C1

This control example duplicates the process conditions disclosed in col. 5, lines 10–16 and 30 of the noted '103 patent.

Using the same embossing system, the procedure of Example 1 is repeated except sheet is fed to the embossing nip at 10 fpm, (3 mpm), the embossing roll surface temperature is 340° F. (163° C.) and contact pressure between embossing and backup rolls is 120 psi (827 kPa). The enlarged form of the actual configuration of the ridges of the surface pattern obtained is as depicted in FIGS. 3, 4. R2 is measured at 0.0034 inch. Roughness surface measurements obtained are:

Base Sheet SR (unembossed)
  $R_z$=34.1 micrometers
  $R_{sm}$=536.2 micrometers
Embossed sheet
  $R_z$=48.2 micrometers
  $R_{sm}$=430.3 micrometers
After 100° C. exposure
  $R_z$=36.3 micrometers
  $R_{sm}$=450.1 micrometers
Surface Permanence (average of both sides)=48.5%
Stack Sticking=123.8 gm/cm The above data shows the unexpected 75% reduction in stack sticking occurring when the peaks of the ridges of the regular surface pattern of the invention have a tight radius of less than 0.0034 inch and a surface permanence of at least 70%.

Further runs as described in Example 1 are made to provide the ridge peak radii R1 and stack sticking levels shown in FIG. 7 by manipulating embossing conditions; (temperatures ranged from 340° to 500° F. (171° C. to 260° C.) at throughputs of 20 fpm (6.1 mpm.). Except for the point labeled "34", R1 is always <0.0034 inch and stack sticking < about 80 gm/cm. Surface permanence of each side for the configurations represented in FIG. 7 in each case is at least 70%.

The preceding description is for illustration and should not be taken as limiting. Various modifications and alterations will be readily suggested to persons skilled in the art. It is intended, therefore, that the foregoing be considered exemplary only and that the scope of the invention be ascertained from the following claims.

We claim:

1. Thermoplastic sheet comprising plasticized polyvinyl butyral having a regular pattern of ridges and channels integrally formed in each side arranged at an angle of intersection with respect to each other of at least 25 degrees, said ridges tapering to flattened V-shaped peaks of tight radius of less than 0.0034 inch, said sheet having a surface permanence of at least 70% on each side.

2. The sheet of claim 1 wherein the tight radius is less than 0.0015 inch.

3. Thermoplastic sheet comprising plasticized polyvinyl butyral of shaped peripheral configuration matching or substantially matching the curved periphery of a laminated safety glass panel, said shaped sheet having a regular pattern of ridges and channels integrally formed in each side arranged at an angle of intersection with respect to each other of at least 25 degrees, said ridges tapering to flattened V-shaped peaks of tight radius of less than 0.0034 inch, said sheet having a surface permanence of at least 70% on each side.

4. The sheet of claim 3 wherein the surface permanence is at least 85%.

5. Multiple shaped thermoplastic sheets of plasticized polyvinyl butyral removably resting in abutting face to face sticking relationship in a stack, each sheet having a regular pattern of ridges and channels integrally formed in each of its sides arranged at an angle of intersection with respect to each other of at least 25 degrees, said ridges tapering to flattened V-shaped peaks of tight radius of less than 0.0034 inch, each face of each sheet having a surface permanence of at least 70%, flattened V-shaped peaks of the ridges in one face of each sheet within the stack resting on flattened V-shaped peaks of the ridges in the opposite face of the next lower sheet in the stack, the topmost sheet in the stack being peelably separable from the next lower sheet by exertion of a force less than about 80 grams per centimeter of sheet length.

\* \* \* \* \*